(12) United States Patent
Kim et al.

(10) Patent No.: US 6,510,145 B1
(45) Date of Patent: Jan. 21, 2003

(54) METHOD AND APPARATUS FOR PROVIDING PACKET DATA SERVICE IN A COMMUNICATION SYSTEM

(75) Inventors: Young-Ky Kim, Seoul (KR); Jae-Min Ahn, Seoul (KR); Soon-Young Yoon, Seoul (KR); Hee-Won Kang, Seoul (KR)

(73) Assignee: Samsung Electronics, Co., Ltd. (KR)

( * ) Notice: Subject to any disclaimer, the term of this patent is extended or adjusted under 35 U.S.C. 154(b) by 0 days.

(21) Appl. No.: 09/114,993

(22) Filed: Jul. 14, 1998

(30) Foreign Application Priority Data

| Jul. 25, 1997 | (KR) | 97-34919 |
| Jan. 13, 1998 | (KR) | 97-1476 |

(51) Int. Cl.[7] .................................................. H04Q 7/00
(52) U.S. Cl. ........................................ 370/329; 370/349
(58) Field of Search ................................. 370/328, 329, 370/335, 336, 341, 342, 345, 348, 349; 455/455, 458, 507, 515, 516, 517

(56) References Cited

U.S. PATENT DOCUMENTS

| 4,939,510 | A |   | 7/1990  | Masheff et al. |         |
|-----------|---|---|---------|----------------|---------|
| 5,299,198 | A | * | 3/1994  | Kay et al.     | 370/347 |
| 5,365,450 | A |   | 11/1994 | Schuchman et al. |       |
| 5,375,253 | A | * | 12/1994 | Lopponen       | 455/517 |
| 5,383,177 | A |   | 1/1995  | Tateishi       |         |
| 5,390,299 | A |   | 2/1995  | Rege et al.    |         |
| 5,392,281 | A |   | 2/1995  | Baumert et al. |         |
| 5,418,812 | A |   | 5/1995  | Reyes et al.   |         |
| 5,467,344 | A |   | 11/1995 | Solomon et al. |         |
| 5,499,237 | A |   | 3/1996  | Richetta et al.|         |
| 5,528,664 | A |   | 6/1996  | Slekys et al.  |         |
| 5,533,019 | A |   | 7/1996  | Jayapalan      |         |
| 5,535,210 | A |   | 7/1996  | Smolinske et al. |       |
| 5,541,917 | A |   | 7/1996  | Farris         |         |
| 5,560,021 | A |   | 9/1996  | Vook et al.    |         |
| 5,570,355 | A |   | 10/1996 | Dail et al.    |         |
| 5,583,562 | A |   | 12/1996 | Birch et al.   |         |
| 5,590,133 | A |   | 12/1996 | Billström et al. |      |
| 5,617,424 | A |   | 4/1997  | Murayama et al. |        |
| 5,666,348 | A |   | 9/1997  | Thornberg et al. |       |
| 5,666,364 | A |   | 9/1997  | Pierce et al.  |         |
| 5,673,259 | A |   | 9/1997  | Quick, Jr.     |         |
| 5,708,656 | A |   | 1/1998  | Noneman et al. |         |
| 5,732,085 | A |   | 3/1998  | Kim et al.     |         |
| 5,734,867 | A |   | 3/1998  | Clanton et al. |         |
| 5,742,588 | A |   | 4/1998  | Thornberg et al. |       |
| 5,745,695 | A |   | 4/1998  | Gilchrist et al. |       |
| 5,757,772 | A |   | 5/1998  | Thornberg et al. |       |
| 5,758,256 | A |   | 5/1998  | Berry et al.   |         |
| 5,802,465 | A | * | 9/1998  | Hamalainen et al. | 455/403 |
| 5,924,042 | A | * | 7/1999  | Sakamoto et al. | 455/458 |
| 6,078,817 | A | * | 6/2000  | Rahman         | 455/452 |
| 6,167,270 | A | * | 12/2000 | Rezaiifar et al. | 455/442 |

FOREIGN PATENT DOCUMENTS

| EP | 0615393 | 9/1994  |
| WO | 9720444 | 6/1997  |
| WO | 9748249 | 12/1997 |

OTHER PUBLICATIONS

Milwaukee, Wisconsin presentation of Jul. 14–18, 1997, 14 pages.

* cited by examiner

*Primary Examiner*—Kwang Bin Yao
(74) *Attorney, Agent, or Firm*—Dilworth & Barrese, LLP

(57) ABSTRACT

Method and apparatus for providing a packet data service between a terminal and a base station in a mobile communication system includes packet data being transmitted from the terminal (base station) on a reverse (forward) packet traffic channel to the base station (terminal) during a data transmission period; the occupation of the reverse (forward) packet traffic channel is released during a data transmission suspension period; and the base station controls the reverse (forward) packet traffic channel over a packet control channel.

13 Claims, 10 Drawing Sheets

METHOD AND APPARATUS FOR PROVIDING PACKET DATA SERVICE IN A COMMUNICATION SYSTEM

BACKGROUND OF THE INVENTION

1. Field of the Invention

The present invention relates to a data communication methods and apparatus in a CDMA (Code Division Multiple Access) communication system and, more particularly, to packet data service providing methods and apparatus.

2. Description of the Related Art

In CDMA and W-CDMA (Wideband-CDMA), considered as a standard for the next generation communication system, packet data communication is implemented with one-to-one continuous connection established between a terminal and a base station. However, it is ideal that the one-to-one connection between a terminal and a base station lasts as long as packet data is exchanged and is released during a packet data communication suspension period, so that the capacity of communication channels is efficiently used and thus communication cost is saved for users.

A conventional packet data service in a CDMA communication system suffers excessive overheads due to the continuous one-to-one connection state of communication channels during a packet data service, thus decreasing use efficiency of a channel capacity and imposing increased cost on users. Moreover, the demands for data service such as PC (Personal Computer) communication, Internet access, and mobile communication-based data service are gradually increasing. Most data services are performed in the form of packet data and data is availability instantaneously rather than always being present. That is, most data communications are packet data communications.

As a result, there is a need for enabling more subscribers to access a data service at low cost by minimally modifying the conventional CDMA network interface structure.

FIG. 1 is a block diagram of a terminal (e.g., fixed or mobile subscriber station), a base station, and a radio link in a mobile communication system. The radio link of FIG. 1 is composed of a forward channel for data transmission from the base station to the terminal and a reverse channel for data transmission from the terminal to the base station.

A conventional CDMA mobile communication system has a forward channel structure as shown in FIG. 3 and a reverse channel structure as shown in FIG. 2. The forward CDMA channel has a pilot channel, a sync channel, a paging channel, and a forward traffic channel divided into a fundamental channel and a supplemental channel. The reverse CDMA channel includes an access channel and a reverse traffic channel divided into a fundamental channel and a supplemental channel.

A conventional bidirectional traffic channel has too low a bit rate to provide a packet data service. An approach to ensuring a bit rate high enough for implementing a packet data service in a conventional bidirectional traffic channel is to separate the traffic channel into a fundamental channel and a supplemental channel. The fundamental channel provides the same function of the conventional bidirectional traffic channel and the supplemental channel provides packet data communication. For a packet data service, a call is maintained between a base station and a terminal, as shown in FIG. 1 via forward and reverse fundamental channels.

FIG. 4 is a flowchart illustrating the use of channels for a conventional packet data service. Referring to FIG. 4, a basic call is set up between a terminal and a base station using a pilot channel, a sync channel, a paging channel and an access channel, in step 411. Here, the basic call is bidirectionally performed on forward and reverse fundamental channels. In step 412, the base station (terminal) determines whether a request for packet data transmission has been issued from the terminal (base station). In the absence of the packet data transmission request, the procedure jumps to step 417 in which the call is maintained on the bidirectional fundamental channels.

In the presence of the packet data transmission request in step 412, the base station (terminal) notifies the terminal (base station) of use of a supplemental channel on the forward (reverse) fundamental channel, in step 413, and the terminal (base station) sends an acknowledge signal to the base station (terminal) on the reverse (forward) fundamental channel, in step 414. In step 415, packet data is completely transmitted on bidirectional supplemental channels. Upon completion of the packet data transmission/reception, the bidirectional supplemental channels stop their action in step 416. Then, the call is maintained on the bidirectional fundamental channels, in step 417.

The above call set-up procedure will now be reviewed with respect to the terminal. A controller of the terminal obtains information on a corresponding base station via a pilot channel, a sync channel, and a paging channel among the forward channels of the base station. Information for access to the base station is generated by a message processor of the terminal, converted to a signal by a baseband processor, and transmitted to the base station on a reverse access channel.

A message processor in the base station analyses the access information received from the terminal, gets forward and reverse fundamental channels ready, and sends to the terminal a message on the paging channel indicating that the fundamental channels are ready. A message processor of the terminal obtains the forward fundamental channel, using the bidirectional fundamental channel information received from the base station. Then, the terminal sends a signal to the base station on the reverse fundamental channel in order to allow the base station to obtain the reverse fundamental channel. When the base station succeeds in obtaining the reverse fundamental channel, it notifies the terminal of the fact on the forward fundamental channel. When the base station and the terminal obtain the bidirectional fundamental channels, the call set-up is completed.

Following the call set-up on the bidirectional fundamental channels, the terminal and the base station await packet data transmission/reception, while exchanging their information on the bidirectional fundamental channels. Despite the absence of transmit/receive packet data, the call is maintained on the bidirectional fundamental channels. Packet data communication, after the call set-up, is implemented while repeating the procedure shown in FIG. 4.

FIG. 5 is a state transition diagram of a terminal on the basis of a conventional CDMA standard. Referring to FIG. 5, when power is on in a state 511, the terminal is set to an initialization state 512. If the terminal synchronizes its timing to that of a system in the initialization state 512, the terminal transits to an idle state 513. The terminal may attempt a call, the base station transmits information of the call attempt to the terminal on a paging channel, and the terminal sends a page response message to the base station, in the idle state 513. Then, the terminal is set to a system access state 514. If the terminal fails to obtain a paging channel message or is directed from the base station to a different adjacent base station in a handoff in the idle state 513, the terminal returns to the initialization state 512. Here, if the terminal succeeds in system access except for the call attempt or reception of a call acknowledge signal in the system access state 514, the terminal returns to the idle state 513. However, if the terminal succeeds in the call attempt or reception of the call acknowledge signal in the system access state 514, the terminal goes to a traffic channel state 515. The traffic channel state 515 lasts as long as traffic is processed. When traffic channels stop their action, the terminal returns to the initialization state 512.

A communication system maintains a call on bidirectional fundamental channels despite infrequent transmit/receive packets in the conventional packet data service. For example, assuming that packet data is transmitted/received for one second in about a one minute interval, the communication system remains logged on the bidirectional fundamental channels for 59 seconds even with data transmission/reception suspended. In this case, a signal transmitted on the bidirectional fundamental channels interferes with another channel, resulting in wasted capacity of another supportable service in the CDMA communication network. Furthermore, as more users demand the packet data service, the CDMA mobile communication network becomes less accessible to users confined to voice communication on fundamental channels only.

The constraint of continuous connection between the terminal and the base station for a short packet transmission/reception increases packet data communication cost and places an obstacle on wide provision of the packet data communication over the CDMA mobile communication network. As a result, the CDMA mobile communication lags behind other communication systems in competitiveness and thus is less utilized.

SUMMARY OF THE INVENTION

An object of the present invention is to provide methods and apparatus for providing a packet data service in a CDMA mobile communication system such that channels are occupied only during packet transmission/reception while a call is established.

Another object of the present invention is to provide methods and apparatus for providing packet data service such that voice and data service channels are processed independently with a new channel structure introduced.

To achieve the above and other objects, there is provided methods and apparatus for providing packet data service between a terminal and a base station in a mobile communication system. In one method and apparatus, packet data is transmitted from the terminal (base station) on a reverse (forward) packet traffic channel to the base station (terminal) during a data transmission period, the occupation of the reverse (forward) packet traffic channel is released during a data transmission suspension period; and the base station controls the reverse (forward) packet traffic channel over a packet control channel.

These and other objects, features and advantages of the present invention will become apparent from the following detailed description of illustrative embodiments thereof, which is to be read in connection with the accompanying drawings in which the same reference numerals are used throughout the various figures to designate same or similar components.

DETAILED DESCRIPTION OF PREFERRED EMBODIMENTS

It is to be appreciated that packet data service methods and apparatus in a CDMA communication system according to the present invention avoids occupation of forward and reverse channels during a packet data service suspension period with a call established, thereby reducing overheads caused by continuous occupation of fundamental channels for transmission/reception of packet data and affords a packet data service to a large number of terminals with one or a small number of common channels.

Figure 6:
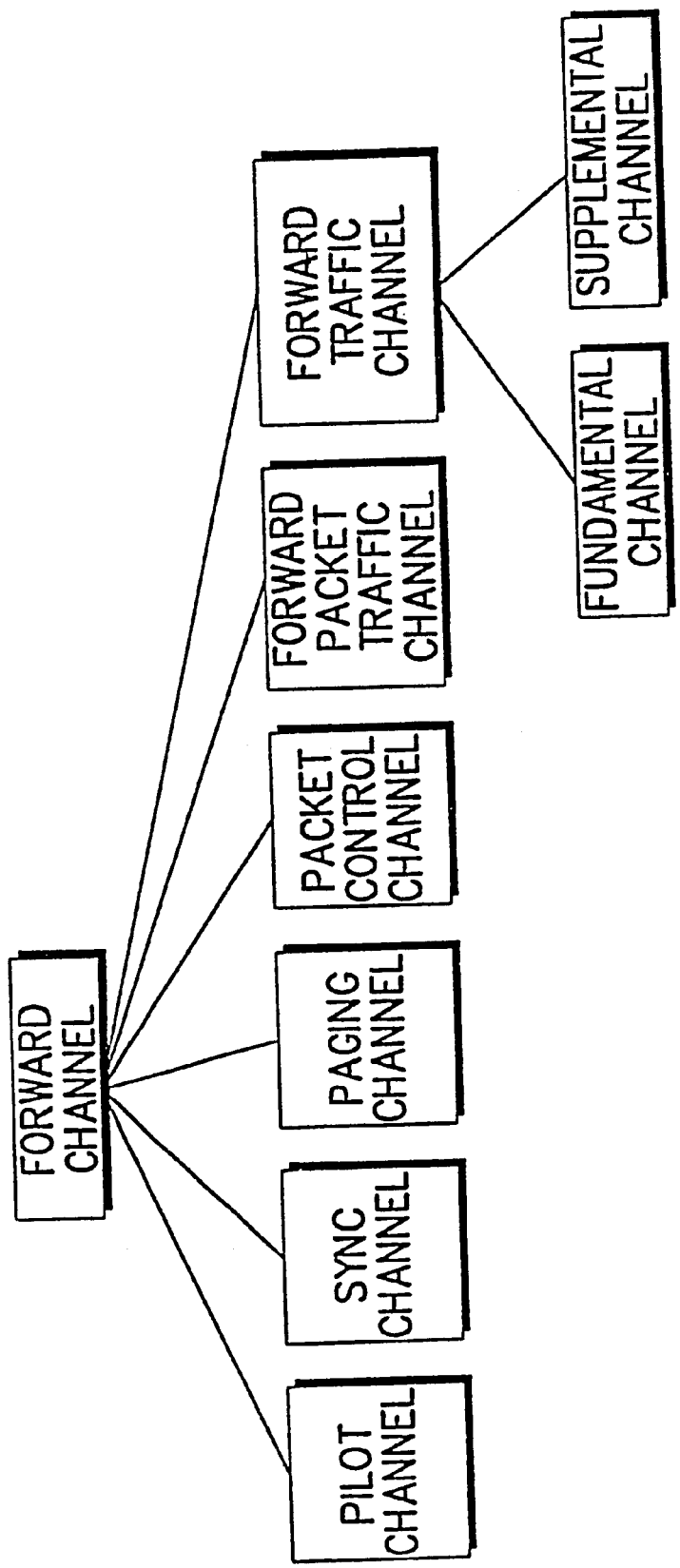
FIG. 6 illustrates the structure of a forward channel for a packet data service according to an embodiment of the present invention.
Figure 7:
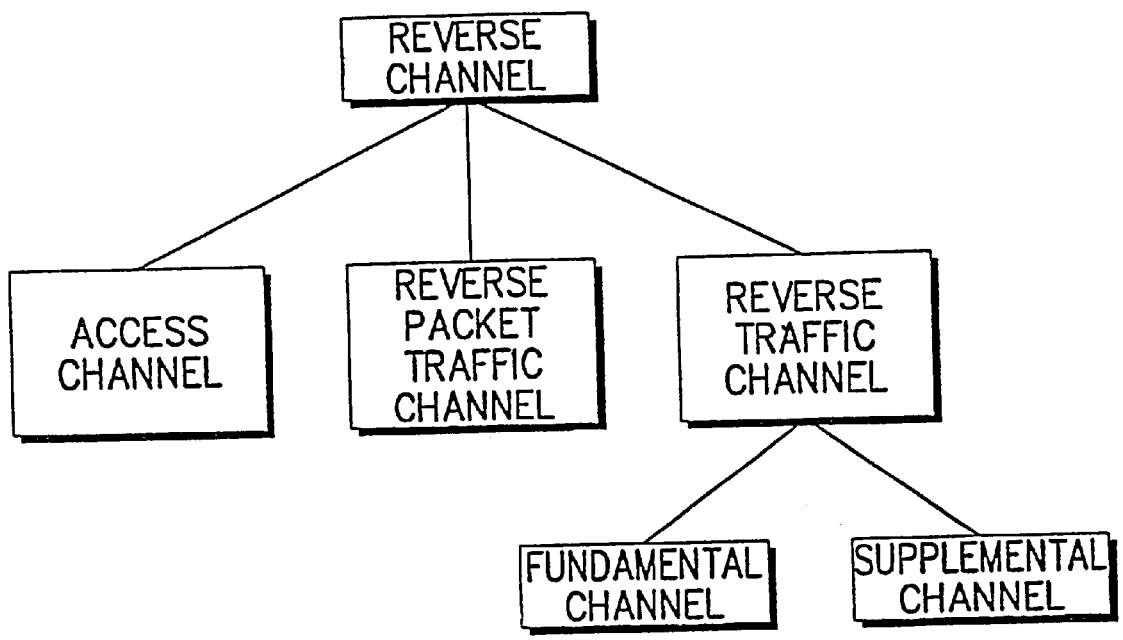
FIG. 7 illustrates the structure of a reverse channel for the packet data service according to an embodiment of the present invention.

New channel structures are designed for the above packet data service according to the present invention, as shown in FIGS. 6 and 7. Referring to FIG. 6, a forward channel of the present invention includes a pilot channel, a sync channel, a paging channel, a packet control channel, a forward packet traffic channel, and a forward traffic channel. The forward traffic channel is further divided into a fundamental channel and a supplemental channel. Referring to FIG. 7, a reverse channel of the present invention includes an access channel, a reverse packet traffic channel, and a reverse traffic channel. The reverse traffic channel is also divided into a fundamental channel and a supplemental channel.

Two forward channels and one reverse channel are newly defined in the channel structures of FIGS. 6 and 7 for the packet data service according to an embodiment of the present invention: the packet control channel and the forward packet traffic channel in the forward channel; and the reverse packet traffic channel in the reverse channel. The forward packet traffic channel supports a path of packet data travelling on a forward link from a base station to a terminal. The reverse packet traffic channel supports a path of packet data travelling on a reverse link from the terminal to the base station.

It is to be appreciated that the packet control channel controls terminals so that a large number of terminals accommodate a small number of forward and reverse packet traffic channels. Further, the packet control channel also serves to control the output power level of a terminal accessing to the system on the reverse packet traffic channel, thereby controlling system capacity, in turn.

Figure 1:
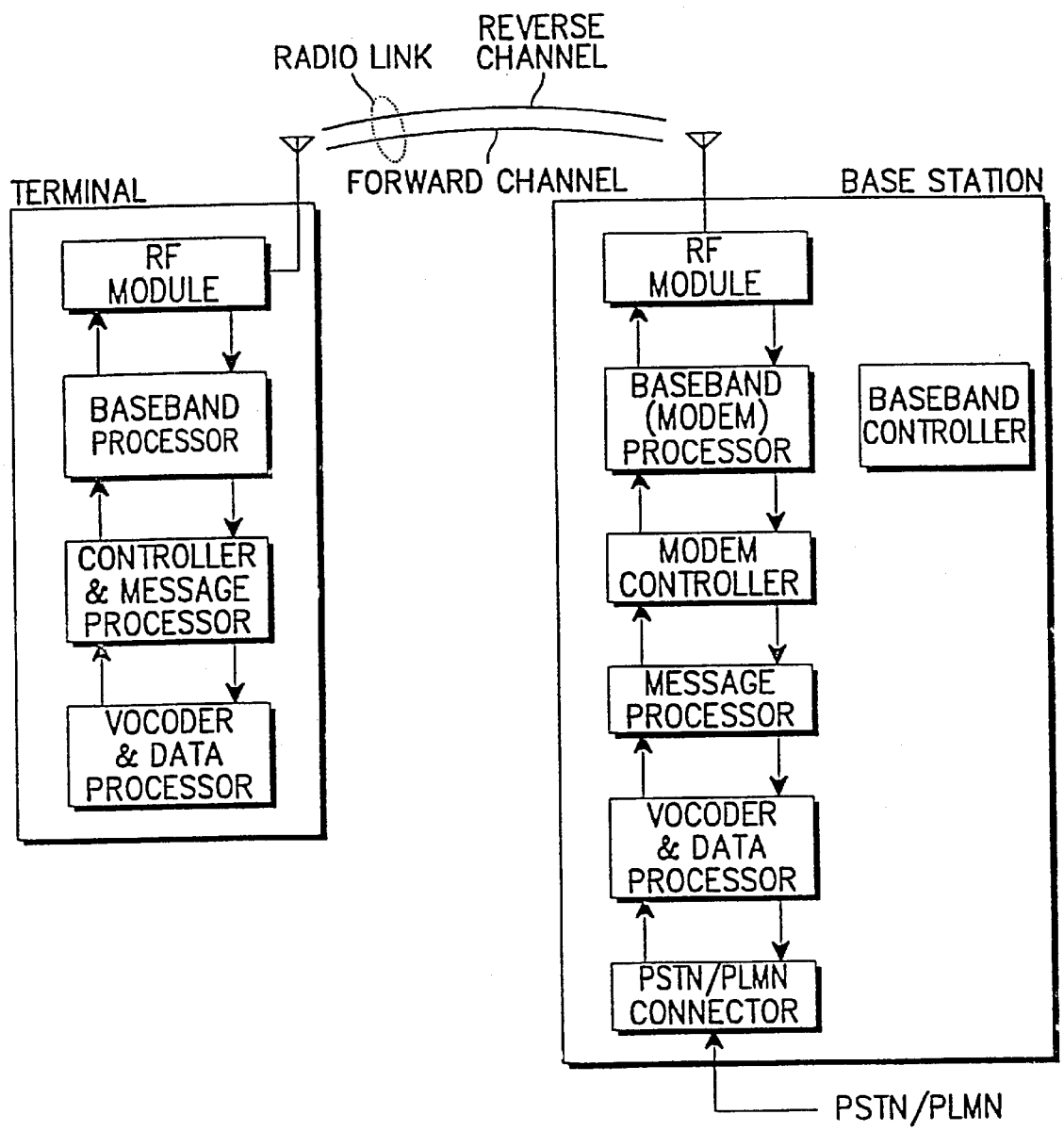
FIG. 1 is a block diagram of a terminal, a base station, and a radio link in a mobile communication system.
Figure 2:
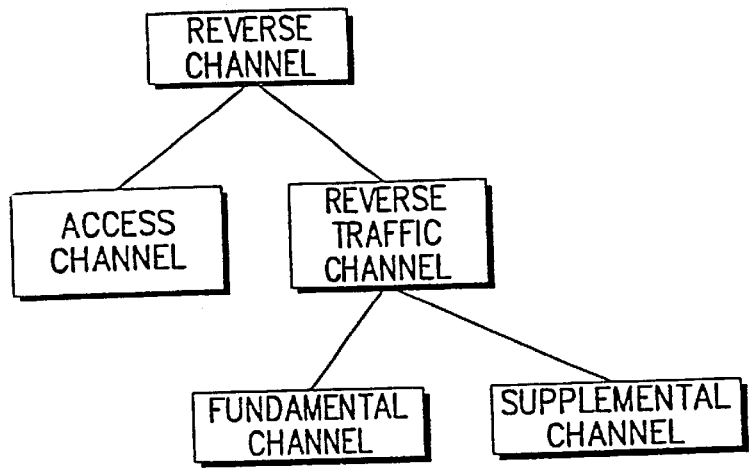
FIG. 2 illustrates the structure of a reverse channel for a conventional packet data service.
Figure 3:
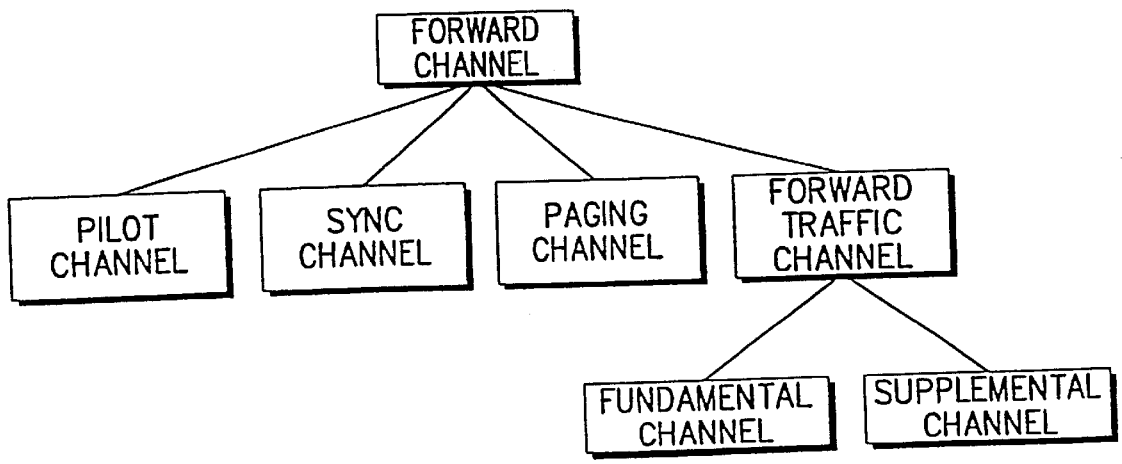
FIG. 3 illustrates the structure of a forward channel for the conventional packet data service.
Figure 4:
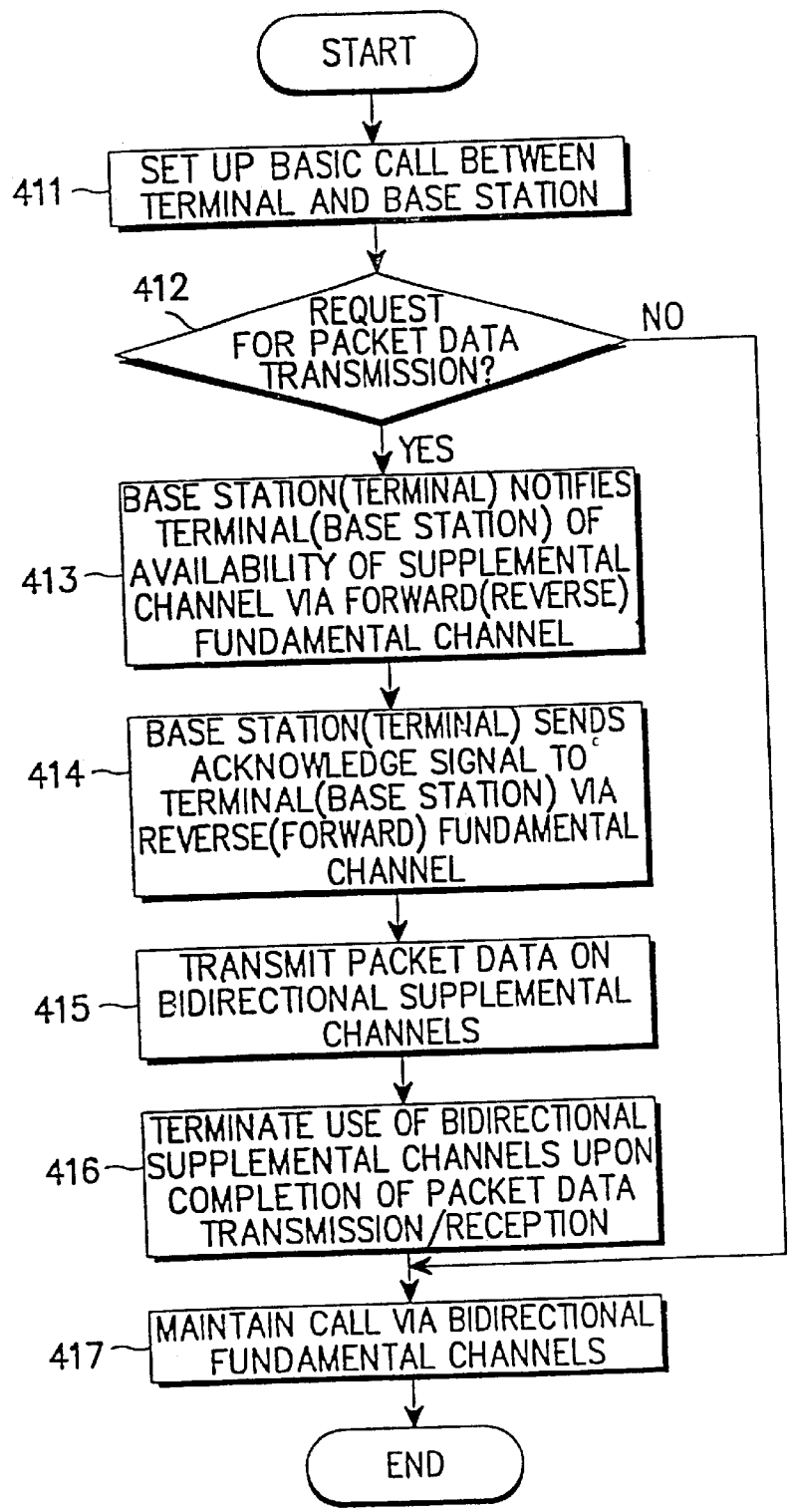
FIG. 4 is a flowchart illustrating the use of channels for the conventional packet data service.
Figure 5:
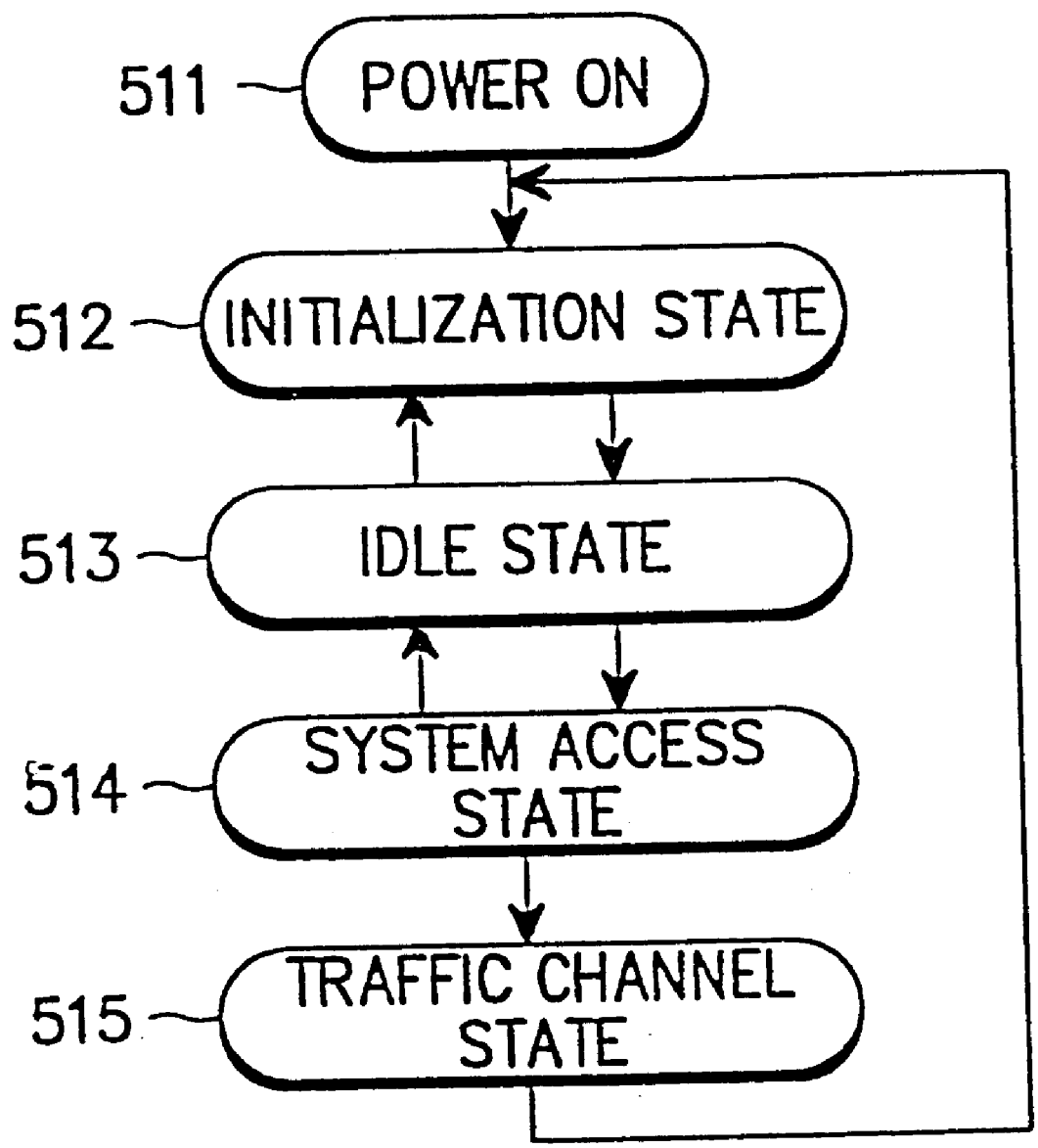
FIG. 5 illustrates a state transition diagram of a terminal on the basis of a conventional CDMA standard.
Figure 8:
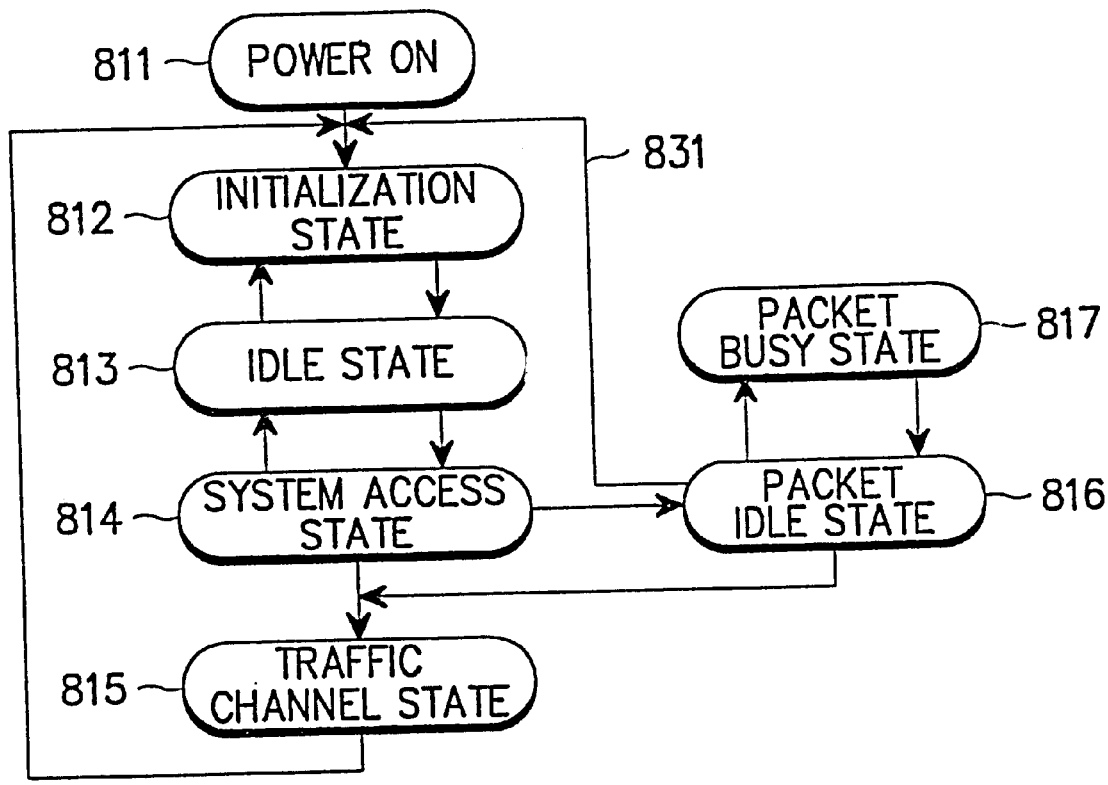
FIG. 8 is a state transition diagram of a terminal for a packet data service according to an embodiment of the present invention.

The introduction of the new channels for the packet data service yields a change to the conventional state transition diagram of FIG. 5. FIG. 8 is a state transition diagram of a terminal for packet data service according to the present invention.

Referring now to FIG. 8, when power is initially on in a state 811, the terminal is set to an initialization state 812. If the terminal synchronizes its timing to that of a system in the initialization state 812, the terminal transits to an idle state 813. The terminal may attempt a call, the base station transmits information of the call attempt to the terminal on a paging channel, and the terminal sends a page response message to the base station on an access channel, in the idle state 813. Then, the terminal is set to a system access state 814. If the terminal fails to obtain a paging channel message or is directed from the base station to a different adjacent base station in a handoff in the idle state 813, the terminal returns to the initialization state 812.

If the terminal succeeds in the call attempt or reception of the call acknowledge signal in the system access state 814, the terminal goes to a traffic channel state 815. However, if the terminal succeeds in system access except for the call attempt or reception of a call acknowledge signal in the system access state 814, the terminal returns to the idle state 813. When a packet mode is registered in the system access state 814, the terminal is set to a packet idle state 816. Meanwhile, when traffic channels stop their action in the traffic channel state 815, the terminal returns to initialization state 812.

During transmission/reception of packet data, the terminal is directed from the packet idle state 816 to a packet busy state 817. Upon completion of packet transmission/reception, the terminal returns to the packet idle state 816. The terminal alternates between the packet idle state 816 and the packet busy state 817 depending on packet data transmission/reception or vice versa. When the packet mode is over in the packet idle state 816, the terminal returns to the initialization state 812.

The terminal, mainly aiming at a packet data service as shown in FIG. 8, transits not to the traffic channel state 815 but to the packet idle state 816 upon registration of the packet mode in the system access state 814.

In the packet idle state 816, the terminal periodically monitors a packet control channel to determine whether there is packet data to be received on a forward packet traffic channel. In the presence of received packet data, the terminal demodulates the forward packet traffic channel during a predetermined time in the packet busy state 817.

When there is packet data to be transmitted from the terminal in the packet idle state 816, the terminal waits for an authorization to use a reverse packet traffic channel, while monitoring the packet control channel. Upon receipt of the authorization, the terminal transmits the packets on the reverse packet traffic channel in the packet busy state 817.

Upon completion of the packet data transmission/reception on the forward and reverse packet traffic channels in the packet busy state 817, the terminal periodically monitors the packet control channel again in the packet idle state 816.

One purpose of using the packet control channel is to reliably provide a packet data service to a large number of terminals in the packet idle state via a small number of forward and reverse packet traffic channels. The packet control channel also controls the output power level of a terminal on a reverse packet traffic channel, thus increasing system capacity.

The packet control channel is constituted as in Table 1.

TABLE 1

| forward packet traffic channel status | reverse packet traffic channel access control | reverse packet traffic channel power control bit | reserved (variable BW) |
| --- | --- | --- | --- |

The packet control channel of the above structure remains on, and a single packet control channel occupies one code channel. A plurality of packet control channels can be used for many packet data service subscribers. The single packet control channel is accompanied by one or more forward and reverse packet traffic channels.

As shown in Table 1, the packet control channel notifies a terminal which terminal to occupy a forward packet traffic channel by broadcasting the status of the forward packet traffic channel. It also broadcasts information of an access authority to terminals which intend to occupy a reverse packet traffic channel so that an authorized terminal may transmit packet data on the reverse traffic channel. The packet control channel transmits a power control bit to control the output power levels of terminals in the process of transmitting packet data on the reverse packet traffic channels. Then, the corresponding terminals adjust their own output power levels as directed by the power control bit.

Figure 9:
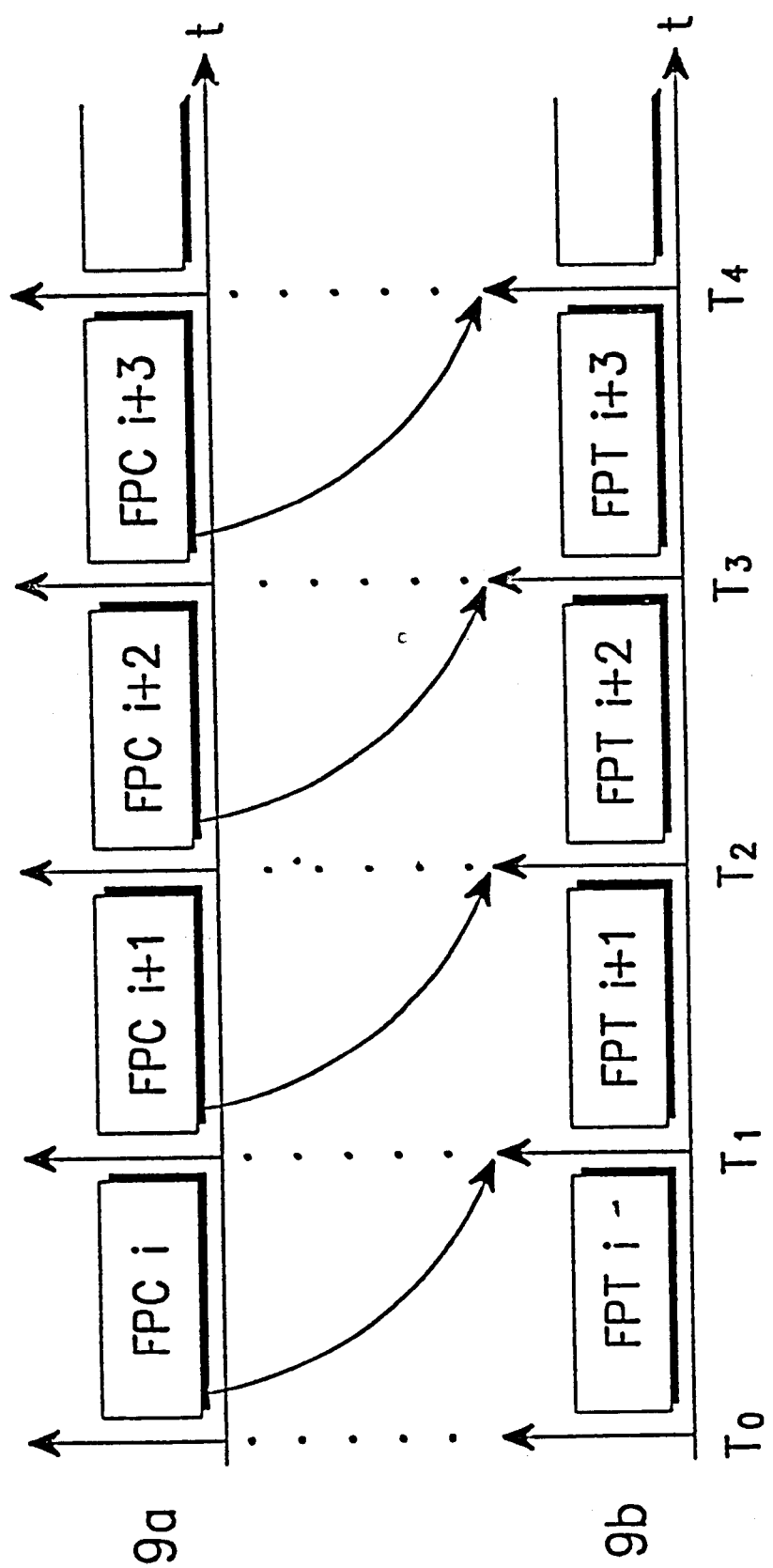
FIG. 9 is graphical diagrams illustrating the timing of a packet control channel with respect to that of a forward packet traffic channel.
Figure 10:
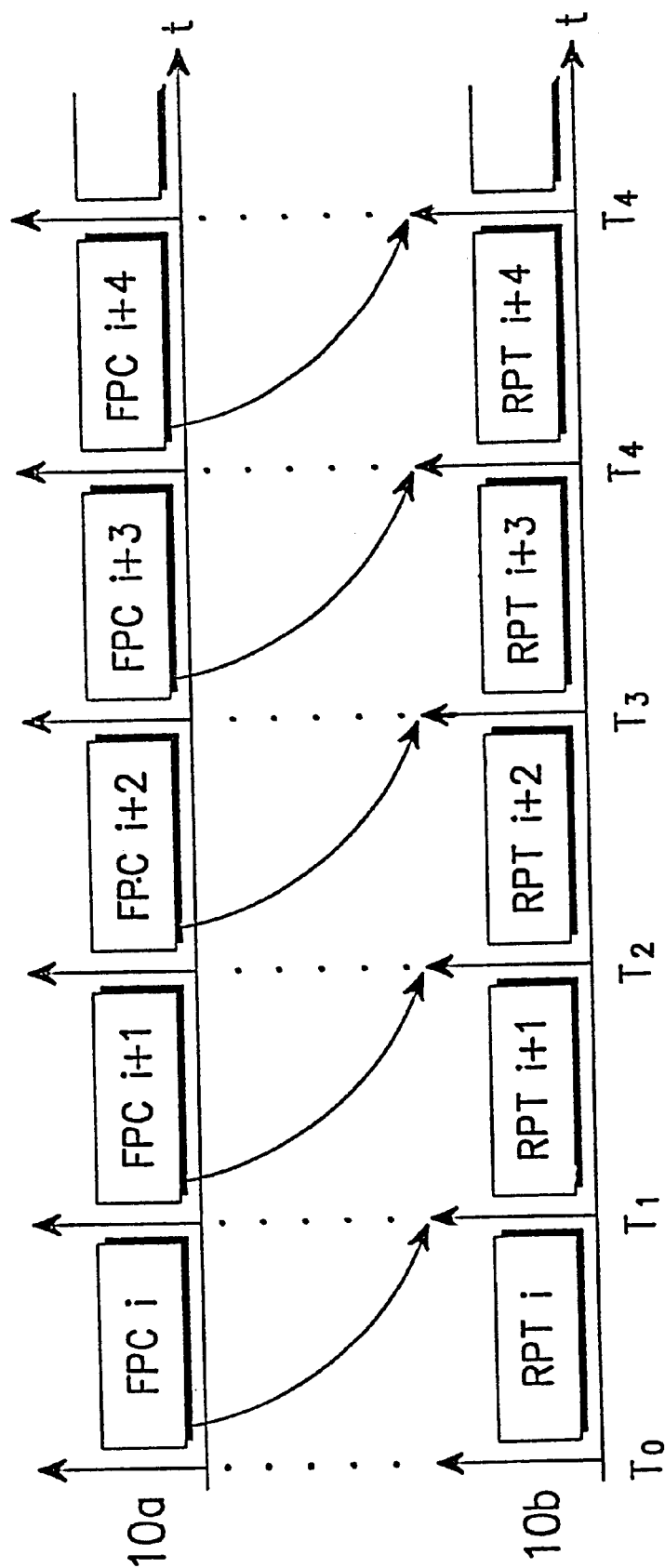
FIG. 10 is graphical diagrams illustrating the timing of the packet control channel with respect to that of a reverse packet traffic channel.

FIG. 9 illustrates the timing of the packet control channel with respect to that of the forward packet traffic channel, and FIG. 10 illustrates the timing of the packet control channel with respect to that of the reverse packet traffic channel.

Referring to FIG. 9, reference numerals 9a and 9b denote the packet control channel and the forward packet traffic channel, respectively. Reference characters FPC i and FPT i indicate packet control channel data and forward packet traffic channel data, assigned to an i-th time slot, respectively.

The terminal is informed of the presence of packet data addressed thereto on the packet control channel, while monitoring the packet control channel 9a, and then demodulates the forward packet traffic channel 9b. The forward packet traffic channel status information of the packet control channel 9a assigned to an i-th time slot indicates a terminal for which the packet data of an (i+1)-th time slot of the forward packet traffic channel 9b is associated. Here, a time slot unit $T=T_{i+1}-T_1$.

Referring to FIG. 10, reference characters 10a and 10b denote the packet control channel and the reverse packet traffic channel, respectively. Reference character FPCi indicates packet control channel data assigned to an i-th time slot, for designating a terminal to access an (i+1)-th time slot and controlling the power of terminals accessing in the i-th time slot. Reference character RPTi indicates reverse packet traffic channel data assigned to the i-th time slot and having a structure of preamble preceding data. Only terminals authorized to access in an (i−1)-th time slot can access the i-th time slot and a terminal authorized but having no transmit data is denied access. Here, the time slot unit $T=T_{i+1}-T_1$.

Figure 11:
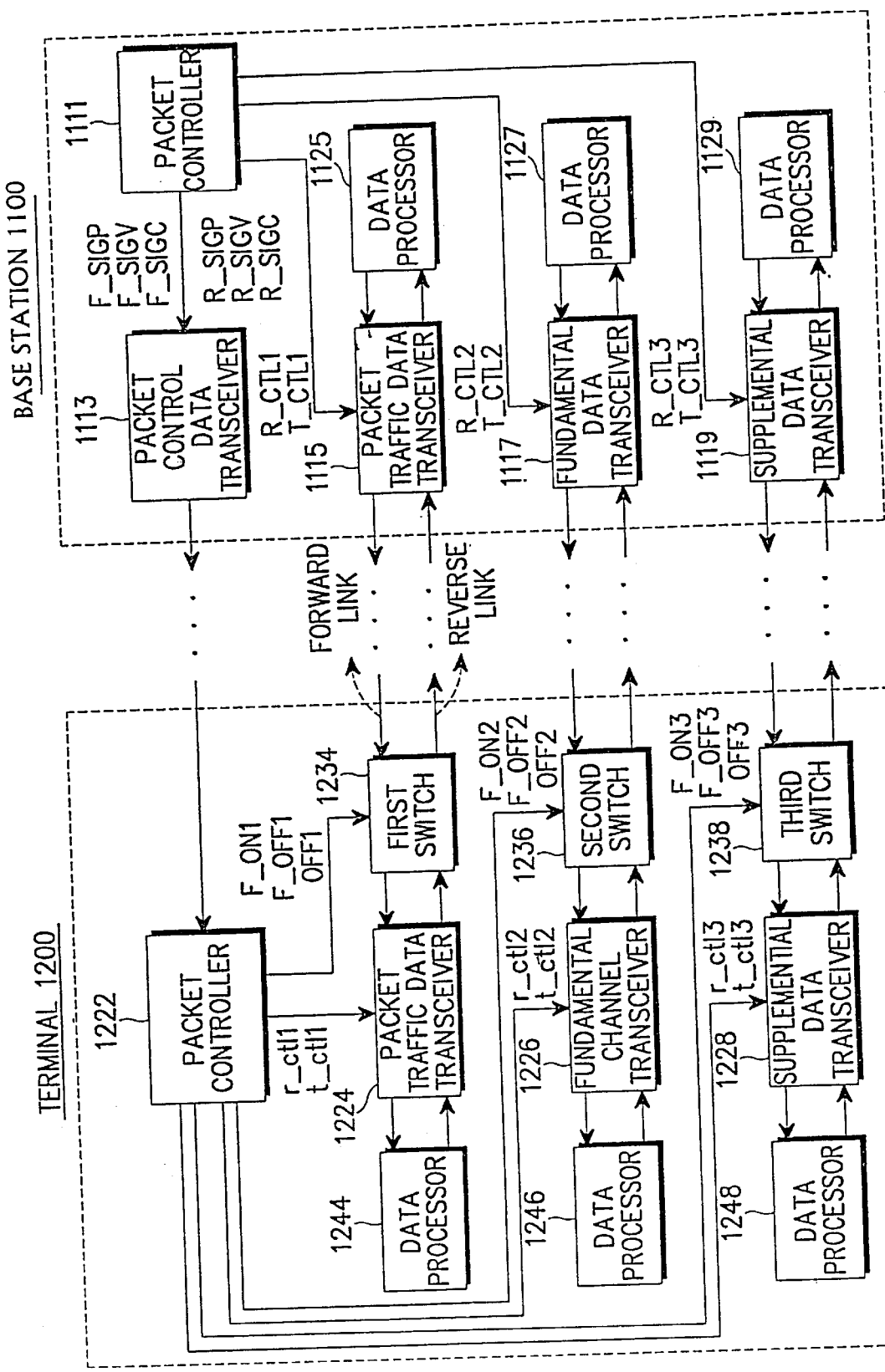
FIG. 11 is a block diagram of a base station and a terminal in a communication system for a packet data service according to an embodiment of the present invention.

FIG. 11 is a block diagram of a base station and a terminal for packet data communications in a communication system according to an embodiment of the present invention.

In a base station 1100, a packet controller 1111 outputs corresponding signalling signals to a packet control data transceiver 1113 and control signals to corresponding transceivers 1115, 1117, and 1119 in order to transmit packet data to a terminal 1200 or receive packet data from the terminal 1200. The signaling signals output from the packet controller 1111 include a forward packet signal F_SIGP, a reverse packet signal R_SIGP, a forward voice signal F SIGV, a reverse voice signal R_SIGV, a forward continuous data signal F_SIGC, and a reverse continuous data signal R_SIGC, and the control signals include a data receive control signal R_CTL and a data transmit control signal T_CTL.

The packet control data transceiver 1113 transmits the signaling signals F_SIGP, R_SIGP, F_SIGV, R_SIGV, F_SIGC, and R_SIGC on a packet control signal under the control of the packet controller 1111. The packet traffic data transceiver 115 transmits/receives packet data to/from the terminal 1200 on packet traffic channels by control signals T_CTL1 and R_CTL1 output from the packet controller 1111. The fundamental data transceiver 1117 transmits/receives data to/from the terminal 1200 on fundamental channels by control signals T_CTL2 and R_CTL2 output from the packet controller 1111. The supplemental data transceiver 119 transmits/receives supplemental data to/from the terminal 1200 on supplemental channel by control signals T_CTL3 and R_CTL3 output from the packet controller 1111.

In the terminal 1200, a packet controller 1222 outputs control signals r_ctl and t_ctl for receiving packet data on a forward channel or transmitting data on a reverse channel by analysing the signaling signals received from the packet control data; transceiver 1113 of the base station 1100. The packet controller 1222 also outputs switch control signals F_ON, F_OFF, and OFF for selecting a forward or reverse link. The receive control signal r_ctl and the transmit control signal t_ctl are used to control corresponding transceivers 1224, 1226, and 1228 for processing data transmitted/received on the forward/reverse channels. The switch control signal F_ON serves to turn on a forward link and turn off a reverse link, the switch control signal F_OFF serves to turn off the forward link and turn on the reverse link, and the control signal OFF serves to turn off both the forward and reverse links.

A first switch 1234 selects a path for the packet traffic data by the switch control signals F_ON1, F_OFF1, and OFF1 output from the packet controller 1222. The packet traffic data transceiver 1224, connected to the first switch 1234, is transmits or receives packet data on a link selected by the switch 1234 under the control of the control signal t_ctl1 or r_ctl1 output from the packet controller 1222.

A second switch 1236 selects a path for the fundamental channel data by the switch control signals F_ON2, F_OFF2, and OFF2 output from the packet controller 1222. The fundamental data transceiver 1226, connected to the second switch 1236, transmits or receives the fundamental channel data on a link selected by the second switch 1236 under the control of the control signal t_ctl2 or r_ctl2 output from the packet controller 1222.

A third switch 1238 selects a path for the supplemental channel data by the switch control signals F_ON3, F_OFF3, and OFF3 output from the packet controller 1222. The supplemental data transceiver 1228, connected to the third switch 1238, transmits or receives the supplemental channel data on a link selected by the third switch 1238 under the control of the control signals t_ctl3 or r_ctl3 output from the packet controller 1222.

Still referring to FIG. 11, the base station 1100 and the terminal 1200 according to the embodiment of the present invention illustrated therein, employ their respective channel structures for independently supporting packet data, as described before. That is, the channel structure of the present invention shown in FIGS. 6 and 7 newly define two forward channels and one reverse channel. Here, the new forward channels are a packet control channel and a forward packet traffic channel, and the new reverse channel is a reverse packet traffic channel. The forward packet traffic channel supports a path for packet data to be transmitted on a forward channel from a base station to a terminal. The reverse packet traffic channel supports a path for transmitting packet data on a reverse channel from the terminal to the base station. In addition, the packet control channel allows a large number of terminals to share a small number of forward and reverse channels, and controls the output power levels of terminals accessing to a system via reverse packet traffic channels to thereby control system capacity.

The control signals as shown in FIG. 11 are defined in the following Table 2.

TABLE 2

| F_SIGP | forward packet signal | R_CTL r_ctl | data receive control signal |
|---|---|---|---|
| R_SIGP | reverse packet signal | T_CTL t_ctl | data transmit control signal |
| F_SIGV | forward voice signal | F_ON | forward link ON reverse link OFF |
| R_SIGV | reverse voice signal | F_OFF | forward link OFF reverse link ON |
| F_SIGC | forward continuous data signal | OFF | forward link OFF reverse link OFF |
| R_SIGC | reverse continuous data signal | | |

Intermittent Forward Packet Data Communication from the Base Station 1100 to the Terminal 1200

The packet controller 1111 sends the control signal F_SIGP to the packet controller 1222 on the packet control channel by controlling the packet control data transceiver 1113, and outputs the control signal T_CTL1 to the packet traffic data transceiver 1115 to designate a forward packet traffic channel. Upon receipt of the control signal F_SIGP from the base station 1100, the packet controller 1222 outputs the control signal r_ctl1 to the packet traffic data transceiver 1224, and the control signals F_ON1, OFF2, OFF3 to the first to third switches 1234 to 1238, respectively. In this case, the base station 1100 sends packet data on the designated forward packet traffic channel and the terminal 1200 processes the packet data received via the designated forward packet traffic channel. During transmission/reception of packet data on the forward link, the base station 1100 and the terminal 1200 use only the packet traffic channels, not forward fundamental and supplemental channels. Upon completion of the packet data transmission/reception on the forward link, the packet controller 1222 outputs the control signal OFF1 to the first switch 1234 to disconnect the packet data transmission/reception path on a forward link.

Intermittent Reverse Packet Data Communication from the Terminal 1200 to the Base Station 1100

The packet controller 1111 of the base station 1100 outputs the control signal R_SIGP to the packet controller 1222 of the terminal 1200 on the packet control channel by periodically controlling the packet control data transceiver 1113. In the presence of packet data to be transmitted to the base station 1100, the packet controller 1222 of the terminal 1200 designates a packet traffic channel by outputting the control signal t_ctl1 to the packet traffic data transceiver 1234 and selects a reverse packet traffic channel by outputting the control signal F_OFF1 to the first switch 1234. The packet controller 1222 of the terminal 1200 turns off a link for a fundamental channel and a supplemental channel by outputting the control signals OFF2 and OFF3 to the second and third switches 1236 and 1238, respectively. Then, the terminal 1200 transmits packet data on the reverse traffic channel to the base station 1100. On the other hand, in the absence of packet data to be transmitted to the base station 1100, the packet controller 1222 of the terminal 1200 outputs the control signals OFF1, OFF2, and OFF3 to the first to third switches 1234, 1236, and 1238, respectively, to thereby turn off the links for the channels.

Continuous Forward Data Communication from the Base Station 1100 to the Terminal 1200

The packet controller 1111 of the base station 1100 sends the control signal F_SIGC to the packet controller 1222 of the terminal on the packet control channel by controlling the packet control data transceiver 1113, and outputs the control signals T_CTL2 and T_CTL3 to the fundamental data transceiver 1117 and the supplemental data transceiver 1119, respectively, to thereby send data on fundamental and supplemental channels. Upon receipt of the control signal F_SIGC, the packet controller 1222 of the terminal 1200 outputs the control signals r_ctl2 and r_ctl3 to the fundamental data transceiver 1226 and the supplemental data transceiver 1228, respectively, and outputs the control signals F_ON2 and F_ON3 to the second and third switches 1236 and 1238, respectively, so that a path is designated to receive data continuously on the forward fundamental and supplemental channels. Then, the base station 1100 continuously transmits data on the designated forward fundamental and supplemental channels to the terminal 1200.

Continuous Reverse Data Communication from the Terminal 1200 to the Base Station 1100

The packet controller 1111 controls the packet control data transceiver 1113 to periodically transmit the control signal R_SIGC to the packet controller 1222 of the terminal 1200 on the packet control channel, and receives continuous data from the terminal 1200 on reverse fundamental and supplemental channels by outputting the control signals R_CTL2 and R_CTL3 to the fundamental data transceiver 1117 and the supplemental data transceiver 1117, respectively. In addition, in the presence of data to be continuously transmitted to the base station 1100, the packet controller 1222 of the terminal 1200 outputs the control signals t_ctl2 and t_ctl3 to the fundamental data transceiver 1226 and the supplemental data transceiver 1228, respectively, and the control signals OFF1, F_OFF2, and F_OFF3 to the first to third switches 1234 to 1238. Then, the terminal 1200 continuously outputs data on the reverse fundamental and supplemental channels. In the absence of data to be continuously transmitted to the base station 1100, the packet controller 1222 outputs the control signals OFF1 to OFF3 to the first to third switches 1234 to 1238, respectively. Therefore, the terminal 1200 transmits data continuously on the designated reverse fundamental and supplemental channels to the base station 1100.

Forward Voice Communication from the Base Station 1100 to the Terminal 1200

The packet controller 1111 of the base station 1100 sends the control signal F_SIGV to the packet controller 1222 of the terminal 1200 by controlling the packet control data transceiver 1113 and outputs voice data on the forward fundamental channel by outputting the control signal T_CTL2 to the fundamental data transceiver 1117. Upon receipt of the control signal F_SIGV on the forward packet control channel, the packet controller 1222 of the terminal 1200 outputs the control signals r_ctl2 to the fundamental data transceiver 1226, and the control signals OFF1, F_ON2, and OFF3 to the first to third switches 1234 to 1238, respectively. Thus, the base station 1100 transmits the voice data on the forward fundamental channel to the terminal 1200.

Reverse Voice Communication from the Terminal 1200 to the Base Station 1100

The packet controller 1111 of the base station 1200 sends the control signal R_SIGV to the packet controller 1222 of the terminal 1200 on the packet control channel by controlling the packet control data transceiver 1113 and designates a reverse fundamental channel by outputting the control signal R_CTL2 to the fundamental data transceiver 1117. Here, in the presence of voice data to be transmitted to the base station 1100, the packet controller 1222 of the base station 1200 outputs the control signal t_ctl2 to the fundamental data transceiver 1226 and designates the reverse fundamental channel by outputting the control signals OFF1, F_OFF2, and OFF3 to the first to third switches 1234 to 1238, respectively. Thus, the terminal 1200 outputs voice data on the reverse fundamental channel to the base station 1200.

As described above, the present invention serves to maximize channel resource use efficiency in a packet data service of a mobile communication network by introducing the packet control channel and the forward and reverse packet traffic channels. That is, the forward or reverse channels are occupied during a packet data transmission/reception period after a call set-up, and are unoccupied during a packet data transmission/reception suspended period, thereby enabling efficient use of channel capacity.

While the present invention has been described in detail with reference to specific embodiments, they are merely exemplary applications. Thus, it is to be clearly understood that many variations can be made within the scope and spirit of the present invention. In actually implementing the packet data service as described above, the timing of the packet control channel with respect to that of the packet traffic channel can be different from that as shown in FIGS. 9 and 10. For example, the i-th time slot of the packet control channel may designate an (i+j)-th time slot of the packet traffic channel instead of the (i+1)-th time slot. Wherein with the same method as the method for designating the (i+j)-th time slot, a slot period can be designated.

What is claimed is:

1. A method for providing a forward packet data service of a base station having a forward packet traffic channel and a packet control channel in a CDMA (Code Division Multiple Access) communication system, comprising the steps of:

transmitting a packet control message via the packet control channel when generating a packet data to be transmitted in a packet idle state, the packet control message including information for assigning a slot period of the forward packet traffic channel and a terminal to be assigned the forward packet traffic channel;

occupying the forward packet traffic channel in the assigned slot period and transmitting the packet data via the occupied slot period of the forward packet traffic channel; and releasing the occupation of the forward packet traffic channel after transmitting the packet data and transitioning to the packet idle state.

2. The method of claim 1, wherein the step of occupying the forward packet traffic channel assigns the forward packet traffic channel in the next slot period subsequent to the slot period, in which the assignment information is transmitted in the packet control.

3. A method for providing a forward packet data service of a terminal having a forward packet traffic channel and a packet control channel in a CDMA (Code Division Multiple Access) communication system, comprising the steps of:

checking terminal information of a packet control message received via the packet control channel in a packet idle state, the packet control message including information for assigning a slot period of the forward packet traffic channel and a terminal to be assigned the forward packet traffic channel;

occupying the forward packet traffic channel in the assigned slot period and receiving the packet data via the occupied slot period of the forward packet traffic channel, when assigning said terminal itself in the packet control message; and releasing the occupation of the forward packet traffic channel after receiving the packet data and transitioning to the packet idle state.

4. The method of claim 3, wherein the terminal assigns the forward packet traffic channel in the next slot period subsequent to the slot period in which the information of the forward traffic channel is transmitted in the packet control channel in the step of the forward packet traffic channel occupation.

5. A method for providing a reverse packet data service of a base station having a reverse packet traffic channel and a packet control channel in a CDMA (Code Division Multiple Access) communication system, comprising the steps of:

transmitting a packet control message via the packet control channel in a packet idle state, the packet control message including information for assigning a slot period of the reverse packet traffic channel and a terminal to be assigned the reverse packet traffic channel;

occupying the reverse packet traffic channel in the assigned slot period and receiving the packet data via the occupied slot period of the reverse packet traffic channel; and releasing the occupation of the reverse packet traffic channel after receiving the packet data and transitioning to the packet idle state.

6. The method of claim 5, wherein the step of transmitting information assigning the slot period of the reverse packet traffic channel further transmits the power control information for controlling the transmitting power level of the terminal assigned in the packet control channel.

7. The method of claim 5, wherein the reverse packet traffic channel is assigned in the next slot period subsequent to the slot period in which the assignment information is transmitted in the packet control channel in the step of the reverse packet traffic channel assignment.

8. A method for providing a reverse packet data service of a terminal having a reverse packet traffic channel and a packet control channel in a CDMA (Code Division Multiple Access) communication system, comprising the steps of:

checking terminal information of a packet control message received via a packet control channel in a packet idle state, the packet control message including information for assigning a slot period of the reverse packet traffic channel and a terminal to be assigned the reverse packet traffic channel;

occupying the reverse packet traffic channel in the assigned slot period and transmitting the packet data via the occupied slot period of the reverse packet traffic channel; and releasing the occupation of the reverse packet traffic channel after transmitting the packet data and transitioning to the packet idle state.

9. The method of claim 8, wherein the step of transmitting the packet data further comprises controlling transmitting the power of the packet data to be transmitted by a power control command received from the packet control channel.

10. An apparatus for providing a forward packet data service of a base station in a CDMA communication system, comprising:

a packet control channel transmitter for transmitting a packet control message;

a forward packet traffic channel transmitter for transmitting a packet data to a designated terminal in an assigned slot period; and a base station packet controller for generating the packet control message when generating the packet data to be transmitted in a packet idle state, said packet control message including information for assigning the slot period of the forward packet traffic channel and the terminal to be assigned the forward packet traffic channel, assigning the forward packet traffic channel in the assigned slot period, releasing the assigned forward packet traffic channel after transmitting the packet data and transitioning to the packet idle state.

11. An apparatus for providing a forward packet data service of terminal in a CDMA communication system, comprising:

a packet control channel receiver for receiving a packet control message;

a forward packet traffic channel receiver for receiving a packet data in an assigned slot period; and a terminal packet controller for checking terminal information of the packet control message received via the packet control channel in a packet idle state, said the packet control message including information for assigning the slot period of the forward packet traffic channel and a terminal to be assigned the forward packet traffic channel, assigning the forward packet traffic channel in the assigned slot period when designating said terminal itself in the packet control message, releasing the assigned forward packet traffic channel after receiving the packet data and transitioning to the packet idle state.

12. An apparatus for providing a reverse packet data service of a base station in a CDMA communication system, comprising:

a packet control channel transmitter for transmitting a packet control message;

a reverse packet traffic channel receiver for receiving a packet data transmitted from a designated terminal in an assigned slot period; and a base station packet controller for generating the packet control message when generating the packet data to be transmitted in a packet idle state, said packet control message including information for assigning the slot period of the reverse packet traffic channel and the terminal to be assigned the reverse packet traffic channel, assigning the reverse packet traffic channel in the assigned slot period, releasing the occupation of the reverse packet traffic channel after receiving the packet data and transitioning to the packet idle state.

13. An apparatus for providing a reverse packet data service of a terminal in a CDMA communication system, comprising:

a packet control channel receiver for receiving a packet control message;

a reverse packet traffic channel transmitter for transmitting a packet data in an assigned slot period;

a terminal packet controller for checking terminal information of the packet control message received via the packet control channel in a packet idle state, said packet control message including information for assigning the slot period of the reverse packet traffic channel and a terminal to be assigned the reverse packet traffic channel, assigning the reverse packet traffic channel in the assigned slot period when designating said terminal itself in the packet control message, releasing the assigned reverse packet traffic channel after transmitting the packet data and transitioning to the packet idle state.

* * * * *